455-608 AU 233 EX
FIP8106 XR 3,906,366

United States Patent [19] [11] 3,906,366
Minami et al.
[45] Sept. 16, 1975

[54] REMOTE CONTROL SYSTEM

[75] Inventors: Shunji Minami, Moriguchi; Takehide Takemura; Shunzo Oka, both of Hirakata, all of Japan

[73] Assignee: Matsushita Electric Industrial Co., Ltd., Japan

[22] Filed: Dec. 10, 1973

[21] Appl. No.: 423,200

[30] Foreign Application Priority Data

Dec. 13, 1972 Japan .............................. 47-125667

[52] U.S. Cl. .................. 325/37; 250/199; 325/139; 325/392; 340/171 R

[51] Int. Cl.$^2$ .............................................. H04B 7/00

[58] Field of Search ......... 325/37, 61, 64, 139, 142, 325/155, 392, 225, 228; 340/167 R, 167 A, 171, 172, 207

[56] References Cited

UNITED STATES PATENTS

| | | | |
|---|---|---|---|
| 2,788,476 | 4/1957 | Shaw | 325/37 |
| 3,103,664 | 9/1963 | Hooper | 343/225 |
| 3,475,092 | 10/1969 | Harvey | 340/167 R X |

*Primary Examiner*—Benedict V. Safourek
*Attorney, Agent, or Firm*—Burgess, Ryan and Wayne

[57] ABSTRACT

A remote control system is disclosed which may gradually control a device or vary a control signal through a non-mechanical oscillation transmission system. The transmitter comprises a high-frequency oscillator, an astable multivibrator adapted to modulate the output of the high-frequency oscillator, and an element adapted to transmit the modulated output signal. The output of the element may be varied by varying the ratio of the pulse width to the pulse period of the output pulses of the astable multivibrator. The high-frequency oscillator is adapted to oscillate at a predetermined frequency which may be arbitrarily selected depending upon the device to be controlled. A receiver can discriminate the received signal so that a device to be controlled by the received signal may be detected and controlled. The discriminated signal is shaped in waveform by a wave-shaping circuit so that a DC voltage whose magnitude is the product of the amplitude of the shaped output signal and the aforesaid ratio of the output pulses of the astable oscillator, is produced to control the intended device.

12 Claims, 2 Drawing Figures

REMOTE CONTROL SYSTEM

BACKGROUND OF THE INVENTION

The present invention relates to a remote control system particularly adapted to gradually control a device.

In order to vary the volume, to change the channel and to turn a television receiver on and off, there have been proposed various remote control systems. But the controlled parameter is generally controlled stepwise, and a mechanical system such as a motor is used when it is desired to remotely control a parameter of a television receiver continuously and linearly. So far, there has not yet been proposed an electronic remote control system capable of remotely controlling a perameter continuously and linearly.

SUMMARY OF THE INVENTION

One of the objects of the present invention is therefore to provide a remote control system capable of controlling continuously and linearly a circuit parameter.

Another object of the present invention is to provide a remote control system which is simple in contruction, reliable in operation and inexpensive to manufacture.

Briefly stated, according to the present invention, the output of a high-frequency oscillator whose oscillation frequency may be selectively set at one of a plurality of predetermined frequencies is modulated by the rectangular waveform output signal of an astable multivibrator. The modulated signal is transmitted to a receiver through a transmission medium such as light, sound, electromagnetic wave or, an oscillating magnetic field which is not a mechanically oscillated wave medium. The astable multivibrator is adapted to vary arbitrarily and gradually the ratio of the pulse width to the pulse period so that the magnitude of the energy of the modulated signal, and hence the magnitude of the output energy of the transmission medium may be also varied gradually. The oscillation frequency of the high-frequency oscillator is selected depending upon the parameter to be controlled. A receiver is adapted to discriminate the received signal depending upon its frequency and to shape the discriminated signal. The ratio of the pulse width to the pulse period of the shaped signal is in proportion to that of the output pulses of the astable multivibrator in the transmitter. Therefore, the rectangular waveform shaped signal varies depending upon the DC component of the rectangular waveform output signals of the astable multivibrator. According to the present invention, the control current is controlled in response to the above DC component, so that a parameter to be controlled may be continuously and gradually controlled.

The above and other objects, features and advantages of the present invention will become more apparent from the following description of the preferred embodiment thereof taken in conjunction with the accompanying drawing.

BRIEF DESCRIPTION OF THE DRAWING

FIG. 3 is a block diagram illustrating a modification of the transmission path of FIGS. 1 and 2, employing sound waves; and FIG. 4 is a block diagram of a further modification of the transmission system of FIGS. 1 and 2, employing magnetic transmission.

DESCRIPTION OF THE PREFERRED EMBODIMENT

Figure 1:
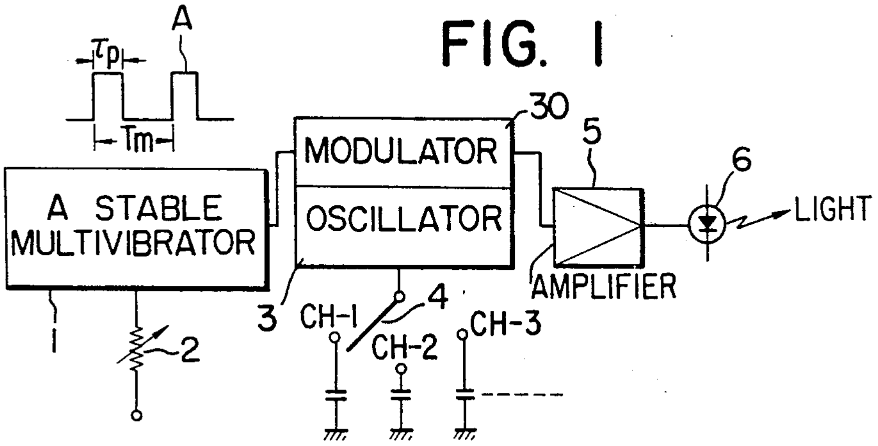
FIG. 1 is a block diagram of a transmitter of a remote control system in accordance with the present invention.

Referring to FIG. 1, the transmitter generally comprises an astable multivibrator 1, an oscillator 3, an amplifier 5, and an electroluminous diode 6. The ratio of the pulse width $\tau_p$ to the pulse period $T_m$ of the rectangular waveform pulses generated by the astable multivibrator 1 may be arbitrarily varied by a variable resistor 2. The oscillator 3 whose oscillation frequency is arbitrarily selected by a switch 4 from a plurality of predetermined frequencies CH1, CH2, CH3, . . . , and CHn provides the signal of frequency, for instance, CH1, which is amplified by the amplifier 5 to drive the electroluminous diode 6 which, for instance, emits infrared rays. The signals of the frequencies CH1, CH2, . . . , and CHn are used to control, for instance, devices for controlling volume, hue, saturation, balance and so on of a television receiver, respectively. The modulation of the oscillations of oscillator 3 may be effected by any well known technique. For example, a modulator 30 may be provided connected to the oscillator, with the output of the multivibrator 1 being connected to the modulator, and the output of the modulator being applied to the amplifier 5.

Figure 2:
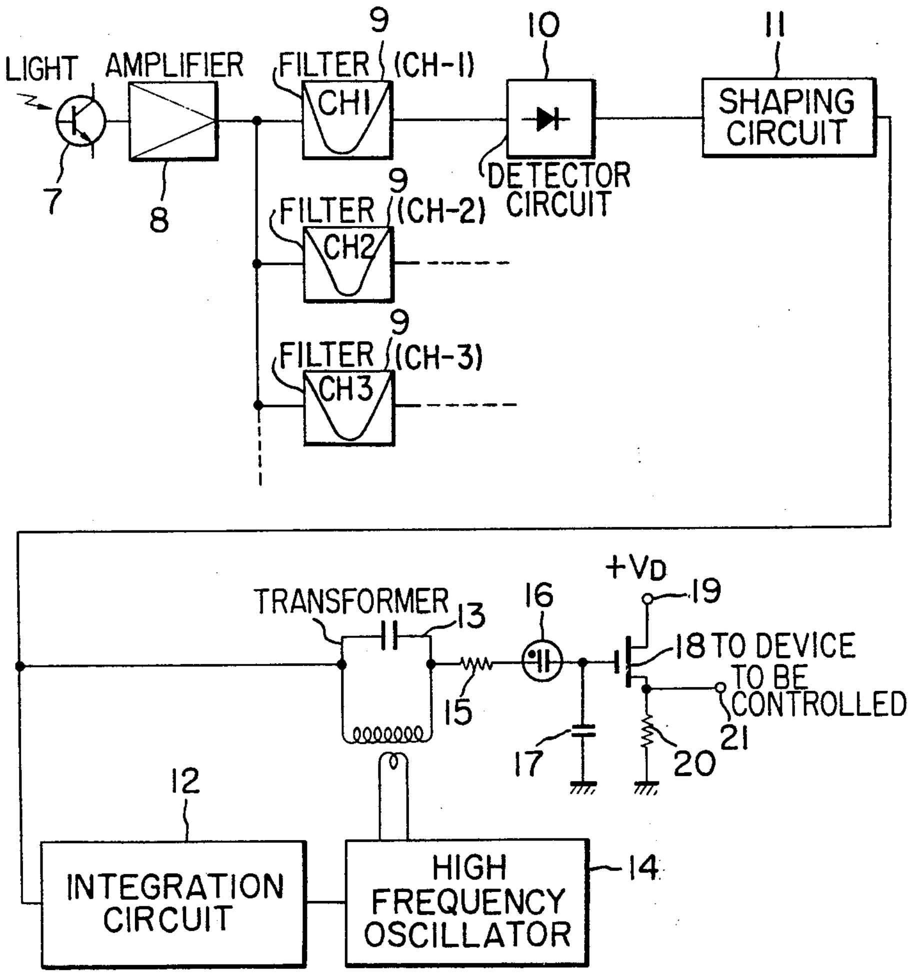
FIG. 2 is a block diagram of a receiver thereof.

Referring to FIG. 2, a phototransistor 7 of a receiver intercepts light signals emitted from the electroluminous diode 6 of the transmitter, and the output of the phototransistor 7 is amplified to a desired level by an amplifier 8 and applied to filters 9(CH1), 9(CH2), . . . , and 9(CHn) so that the signals of the frequencies CH1, CH2, . . . , and CHn may be discriminated from each other. Each of the filters 9 has a similar stage consisting of a detector circuit 10, a wave-shaping circuit 11, an integrator 12, a transformer 13, a high frequency oscillator 14, a resistor 15, a neon lamp 16, a capacitor 17, and a MOS field-effect transistor 18 as shown in FIG. 2. Since the stages following the filters 9 are similar in construction and function except that they process the signals of different frequencies, it will suffice to illustrate the components of the stage of the first filter 9(CH1) and to describe its construction and function.

The output of the filter 9(CH1) is detected by the detector 10 and shaped by the wave-shaping circuit 11 into the rectangular waveform of a predetermined level. The output of the wave-shaping circuit 11 is applied to both the integrator 12 and the transformer 13. The time constant $\tau_f$ of the integrator 12 is about ten times the pulse period $T_m$ of the pulses A generated by the astable multivibrator 1 in the transmitter (See FIG. 1). The output of the integrator 10 includes the DC component so that a high frequency oscillator 14 connected to the integrator 12 is driven to induce a high-frequency voltage across the secondary of the transformer 13. The primary and secondary coils of the transformer 13 are so coupled that the voltage applied to the neon bulb 16 connected through the resistor 15 to the transformer 13 may be higher than the firing voltage of the neon bulb 16. Thus, the rectangular waveform output voltage of the wave-shaping circuit 11 superimposed with the high-frequency voltage is applied to the neon tube 16. The output voltage of the wave-shaping circuit 11 is selected at a lower level than the firing voltage of the neon bulb 16. The amplitude of the output voltage of the wave-shaping circuit 11 is designated by $Ep$. When the superimposed voltage is applied to the neon bulb 16, it is triggered so that the current flows through the neon bulb 16.

The anode of the neon bulb 16 is connected to the gate of the MOS field-effect transistor 18 and to one terminal of the capacitor 17 of which the other terminal is grounded. The drain of the field-effect transistor 18 is connected to a DC drain source terminal 19 to which is applied a DC voltage $V_D$, and the source of the transistor 18 is grounded through an output resistor 20 and is directly connected to an output terminal 21. It should be noted that the DC voltage $V_D$ is higher than the amplitude $Ep$, that is, $V_D > Ep$.

The time constant $\tau_S$ of a time constant circuit consisting of the resistor 15 and the capacitor 17 is selected about more than 100 times the pulse period $T_m$ of the pulses A (See FIG. 1), and the oscillation frequency of the oscillator 14 is selected so that the reactance of the capacitor 17 may be negligible with respect to the resistor 15. Therefore, the harmonic components across the capacitor 17 are negligible, no rectangular waveform components exists, and the voltage across the capacitor 17 is a DC voltage whose level is dependent upon the product of the amplitude $Ep$ of the rectangular waveform and the ratio of the pulse width $\tau_p$ to the pulse period $T_m$. Since the ratio may be varied under the control of the variable resistor 2 in the transmitter, the DC voltage across the capacitor 17 may have a variable level. The voltage across the capacitor 17 is impressed on the gate of the MOS field-effect transistor 18 so that the current flows from the drain to the source. The voltage drop acros the output resistor 20 is derived from the output terminal 21 as an output voltage, which in turn is used as a control voltage for controlling the volume, hue, balance, or the like, of a television receiver.

When the transmitter is turned off, no signal is received by the receiver, so that the output of the wave-shaping circuit is of course zero. Therefore, the output of the integrator 12 is zero, so that the high-frequency oscillator 13 is disabled. Then, the high-frequency voltage induced across the secondary of the transformer 13 is zero, so that the neon bulb 16 is turned off. The voltage across the capacitor 17 remains at a bias level when the neon bulb 16 is turned off. This means that the output voltage across the resistor 20 is in proportion to the voltage across the capacitor 17. Since the resistance of the neon bulb 16 is very high when it is turned off, the discharge of the capacitor 17 may be prevented. Furthermore, the resistance between the gate and source of the MOS field-effect transistor 18 is extremely high, so that the discharge of the capacitor 17 through the transistor 18 is also prevented.

Next, the general mode of operation will be described hereinafter. The ratio of the pulse width $\tau_p$ and pulse period $T_m$ is arbitrarily adjusted by the variable resistor 2 in the transmitter, and in response to the pulse waveform, the electro-luminous diode 6 emits light, which is intercepted by the phototransistor 7 of the receiver, so that the rectangular waveform output signal representing the intensity of the intercepted light is provided by the wave-shaping circuit 11. The output of the wave-shaping circuit 11 is applied to the integrator 12 so that the high-frequency oscillator 14 is actuated to induce the high-frequency voltage across the secondary of the transformer 13. The rectangular waveform output voltage upon which is superposed the high-frequency voltage induced across the secondary of the transformer 13 is applied to the neon bulb 16. The neon bulb 16 is fired so that the current flows therethrough. Therefore, a DC voltage whose amplitude is the product of the amplitude of the rectangular waveform pulse voltage and the ratio of the pulse width $\tau_p$ to the pulse period $T_m$ is induced across the capacitor 17, and is impressed on the gate of the field-effect transistor 18 so that the current flows from the drain to the source. The voltage drop across the output resistor 20 is the output voltage which is used to control a parameter of the transistor set. As described hereinbefore, the ratio of the pulse width $\tau_p$ to the pulse period $T_m$ may be varied by the variable resistor 2. The DC voltage across the capacitor 17 may be also varied. Thus, when the resistance of the variable resistor 2 is continuously varied linearly, the output voltage may be also varied accordingly. Therefore, a variable to be controlled in a remote control system may be continuously controlled linearly.

In the instant embodiment, optical transmission is used, but it is understood that any other suitable transmission system using sound, electromagnetic waves and so on may be used. Thus, as illustrated in FIG. 3, the output of amplifier 5 may be applied alternatively to a sound transmitter 31, such as a loudspeaker, for transmitting of sound waves, and the input of the amplifier 8 may alternatively be connected to a sound receiver 32, such as a microphone. Further, as illustrated in FIG. 4, the output of the amplifier 5 may be alternatively connected to a magnetic field generator, such as a coil, for producing a magnetic field, with the input of the amplifier 8 being connected to a magnetic field detector 34. Conventional transmission devices may, of course, be employed for these elements. Instead of using amplitude modulation, any other suitable modulation such as frequency modulation may be used, but the component parts in the transmitter and receiver must be modified for frequency modulation or any other suitable modulation. Furthermore, the waveform of the output signal of the transmitter is not limited to a rectangular waveform as long as a rectangular voltage or current may be generated in the receiver in response to the received signal. In the receiver, instead of the neon bulb, a relay switch may be used. In this case, the high-frequency oscillator may be eliminated.

The remote control system of the present invention with the construction described above may be used, for instance, with a television receiver to electronically, continuously control the volume in a linear manner, and is very useful. Furthermore, it is simple in construction and may be applied to remote control units for controlling the perameters of devices other than television sets.

What is claimed is:

1. A remote control system comprising

A. a transmitter comprising a. a high-frequency oscillator having a selectively variable oscillation frequency;

b. means for varying the power output of said high-frequency oscillator as a continuous function; and c. means for transmitting the output of said high-frequency oscillator; and B. a receiver comprising d. means for receiving said transmitted output from said transmitter;

e. means for discriminating the received signal depending upon the frequency;

f. means for shaping the discriminated signal into a series of pulses wherein the ratio of the pulse width to the pulse period thereof corresponds to the power of the transmitted signal; and g. means connected to said shaping means for providing a voltage having an amplitude proportional to the product of the ratio of the pulse width to the pulse period of the output of said shaping means and the amplitude of the shaped signal.

2. A remote control system as defined in claim 1 wherein said modulating means comprises amplitude modulating means.

3. A remote control system as defined in claim 1 wherein a. said modulating means comprises pulse train generating means; and b. said means for providing a voltage in proportion to said ratio and the amplitude of said shaped signal comprises a secondary of a transformer directly coupled to said wave-shaping means, a resistor, a neon bulb, and a base of a MOS field-effect transistor interconnected in series in the order named from said secondary of said transformer, a high-frequency oscillator connected to the output of said wave-shaping circuit through an integrator and to the primary of said transformer so as to supply the high frequency to said secondary of said transformer, a capacitor interconnected between the base of said field-effect transistor and the ground, and a resistor connected between the source of said transistor and the ground.

4. A remote control system as defined in claim 1 wherein said transmitting means comprises means for transmitting electromagnetic waves.

5. A remote control system as defined in claim 1 wherein said transmitting means comprises means for transmitting sound.

6. A remote control system as defined in claim 1 wherein said transmitting means comprises means for transmitting an oscillating magnetic field.

7. The remote control system of claim 1, wherein said transmitter comprises means for transmitting the output of the high frequency oscillator with a rectangular waveform.

8. A remote control system comprising a transmitter and a receiver, said transmitter comprising means for transmitting pulses of oscillations of selectively variable frequency and pulse width to pulse period ratios that are selectively variable as a continuous function, said receiver comprising means for receiving the transmitted output from the transmitter, means for discriminating the received signals depending upon the frequency of the oscillations thereof, means for shaping the discriminated signals to produce pulse signals corresponding to the transmitted signals, and means connected to said shaping means for producing a voltage having an amplitude proportional to the product of the ratio of the pulse width to the pulse period of the output of the shaping means and the amplitude of the shaped signal.

9. The remote control system of claim 8, wherein said means for transmitting pulses comprises an oscillator, means for selectively varying the frequency of oscillations of said oscillator, means generating a pulse train of pulses, means for varying the ratio of the pulse width to the pulse period of the pulses of said pulse train as a continuous function, means for modulating the oscillations of said oscillator with said pulse train, and means for transmitting the modulated oscillations.

10. The remote control system of claim 8, wherein said means connected to said shaping means comprises a source of operating potential having first and second terminals, a field effect transistor having a drain electrode connected to said first terminal, a first resistor connected between the source electrode and said second terminal, a storage capacitor connected between the gate of said transistor and said second terminal, switching means, a second resistor and a threshold conducting device connected in series between the output of said shaping means and said gate electrode, and means for operating said switching means in response to an output from said shaping means.

11. The remote control system of claim 10, wherein said threshold means comprises a neon tube.

12. The remote control system of claim 11, wherein said switching means comprises a transformer having a first winding connected in series in the output of said shaping means and a second winding, a high frequency oscillator connected to said second winding, and means for activating said high frequency oscillator in response to output signals from said shaping means.

* * * * *